United States Patent [19]

Bookout

[11] Patent Number: 5,796,197
[45] Date of Patent: Aug. 18, 1998

[54] SUBMERSIBLE MOTOR SEALING SYSTEM

[75] Inventor: Russell Bookout, Fort Wayne, Ind.

[73] Assignee: Franklin Electric Co., Inc., Bluffton, Ind.

[21] Appl. No.: 762,135

[22] Filed: Dec. 9, 1996

[51] Int. Cl.[6] .................................. H02K 5/10; H02K 5/12
[52] U.S. Cl. ........................ 310/85; 310/87; 310/88; 310/89
[58] Field of Search ........................ 310/85, 87, 88, 310/89

[56] References Cited

U.S. PATENT DOCUMENTS

| | | | |
|---|---|---|---|
| 2,446,521 | 8/1948 | Blom | 103/87 |
| 2,569,741 | 10/1951 | Arutunoff | 172/36 |
| 2,682,229 | 6/1954 | Luenberger | 103/87 |
| 2,790,916 | 4/1957 | Hinman | 310/87 |
| 2,854,595 | 9/1958 | Arutunoff | 310/87 |
| 2,922,055 | 1/1960 | Deters | 310/87 |
| 2,974,240 | 3/1961 | Arutunoff | 310/87 |
| 3,052,804 | 9/1962 | Komor | 310/87 |
| 3,072,810 | 1/1963 | Luenberger | 310/87 |
| 3,075,469 | 1/1963 | Lane, Jr. | 103/87 |
| 3,116,432 | 12/1963 | Ekey | 310/87 |
| 3,135,884 | 6/1964 | Luenberger | 310/87 |
| 3,255,367 | 6/1966 | Schaefer | 310/87 |
| 3,270,224 | 8/1966 | Turk | 310/87 |
| 3,369,137 | 2/1968 | Sanger | 310/87 |
| 3,475,634 | 10/1969 | Bogdanov et al. | 310/87 |
| 3,785,753 | 1/1974 | Bogandanov et al. | 417/424 |
| 3,947,709 | 3/1976 | Waltman | 310/87 |
| 4,010,392 | 3/1977 | Bogdanov et al. | 310/87 |
| 4,421,999 | 12/1983 | Beavers et al. | 310/87 |
| 4,436,488 | 3/1984 | Witten | 417/53 |
| 4,460,181 | 7/1984 | Araoka | 277/12 |
| 4,913,239 | 4/1990 | Bayh, III | 166/385 |
| 4,940,911 | 7/1990 | Wilson | 310/87 |
| 5,147,530 | 9/1992 | Chandler et al. | 210/90 |
| 5,316,449 | 5/1994 | Vandendorpe | 417/355 |
| 5,367,214 | 11/1994 | Turner, Jr. | 310/87 |
| 5,404,061 | 4/1995 | Parmeter | 310/87 |
| 5,439,180 | 8/1995 | Baugnman et al. | 241/36 |
| 5,676,889 | 10/1997 | Belgin | 261/93 |

FOREIGN PATENT DOCUMENTS

| | | | |
|---|---|---|---|
| 59 123439-A | 7/1984 | Japan . | |
| 1483553-A | 5/1989 | U.S.S.R. | 310/87 |
| 1764121-A | 9/1992 | U.S.S.R. | 310/87 |

*Primary Examiner*—Thomas M. Dougherty
*Assistant Examiner*—Elvin G. Enad
*Attorney, Agent, or Firm*—Marshall, O'Toole, Gerstein, Murray & Borun

[57] ABSTRACT

An oil-filled, submersible electric motor which contains features designed to prevent both the ingress of well fluid into the motor interior, and the leakage of fluid from the motor interior. The motor contains a liquid-filled top chamber, above the motor's stator and rotor. This top chamber connects, via a tube, with a pressure-relief chamber at the bottom of the motor so that any liquid which migrates into the top of the motor is channeled away from the stator and rotor. The relief chamber also serves as a reservoir to replace any liquid which seeps out of the top chamber. The motor also incorporates a pressure-equalization chamber, beneath the stator and rotor, to accommodate thermal expansion of the dielectric fluid in the motor interior. A bladder in the equalization chamber expands and contracts to keep the motor interior and the well fluid in pressure equilibrium.

12 Claims, 1 Drawing Sheet

5,796,197

1

SUBMERSIBLE MOTOR SEALING SYSTEM

BACKGROUND OF THE INVENTION

The present invention relates generally to submersible electric motors which are used to power underground pumps used in oil and water wells. More particularly, the present invention describes a submersible motor which incorporates a protective system which functions to isolate the interior of the motor from contact with fluids from a well in which the motor is immersed.

Because they are adapted to fit within a narrow well bore, submersible electric motors which are used to power pumps for removing water or oil from an underground well normally have a relatively long length and small diameter. These motors are generally constructed so that a rotor shaft at the top of the motor assembly provides motive power to a centrifugal pump mounted directly above the motor. In its operative environment, the composite pump and motor assembly lies beneath the surface of the liquid in a well.

Although some submersible electric motors are designed to run with the motor interior in contact with the well fluid (for example, by coating or potting the stator and rotor with a resin), the motor of the present invention is of the "oil-filled" type, i.e., a motor where the interior portion of the motor containing the stator and rotor are filled with a dielectric liquid material such as mineral oil. In such an oil-filled motor, the liquid well fluid in which the motor is submerged should be inhibited from entering the interior of the casing which houses the rotor and stator and, correspondingly, the oil in the casing should be inhibited from migrating outside the casing.

Because the interior of an electric motor heats up during operation, thermal expansion of the dielectric in an oil-filled motor is an inevitable consequence. As a result, some dielectric can leak out of the motor casing into the well fluid, typically around the seals where the spline or coupling end of the motor shaft extends from the casing for connection with a pump. Similarly, as the interior of the motor cools and the interior dielectric fluid contracts, migration of well fluid into the motor casing can occur.

The prior art discloses several systems which are designed to lessen the effects of thermal expansion. One procedure is to employ a plurality of seals in the area where the motor shaft exits the motor casing. Another commonly-employed system, shown, for example, in Schaefer et al. U.S. Pat. No. 4,684,837, incorporates a spring-loaded diaphragm at the base of the motor casing. The top of the diaphragm is in contact with the liquid dielectric within the motor, thereby pressurizing the internal dielectric fluid. As the dielectric expands, the increase in volume is accommodated by compression of the spring. Similarly, as the motor cools, the spring urges the diaphragm to its normal position. Although these protective systems greatly lessen the influx of well fluid into the motor interior, and thus prolongs the life of the motor, some seepage does occur.

Electric motors used in petroleum wells are often equipped with pressure equalization devices ("equalizers") which are designed to overcome the effects of thermal expansion of internal dielectric fluid. These equalizers typically comprise separate assemblies placed between the motor and the underground pump; a shaft extension in the equalizer mechanically interconnects the motor with the pump. An example of such an equalizer device is depicted in Wilson U.S. Pat. No. 4,940,911. Because the equalizer is mounted as a separate unit above the motor assembly, the problem of well fluid ingress into the motor is not eliminated, particularly where the well fluid has a density greater than that of the motor dielectric, or where the well fluid is soluble or miscible in the dielectric fluid.

SUMMARY OF THE INVENTION

The present invention discloses a submersible, oil-filled electric motor which incorporates multiple protective features for preventing contamination of motor dielectric fluid with the well fluid in which the motor is immersed.

As noted above, one situs of ingress of well fluid into a submersible pump is at the location where the drive shaft exits the motor casing. The apparatus of the present invention utilizes two shaft seals, preferably mechanical face-type seals, mounted below the spline or coupling end of the motor drive shaft. The upper and lower shaft seals are positioned, respectively, at the top and bottom of a liquid-filled top or seal cavity chamber in the motor casing, which is located above the motor's stator and rotor.

The seal cavity chamber is vented by means of an aperture at the base of the cavity chamber, through a small vent tube, to the bottom of the motor casing. Prior to placing the motor into a well, this top cavity will be filled with a liquid, preferably a non-conductive or dielectric fluid which is less dense than the well fluid itself. Because it is denser, any well fluid (e.g., water) which migrates around the upper seal will tend to settle at the base of the cavity chamber. As well fluid builds up around the cavity aperture, the denser liquid is transported out of the top cavity chamber to the bottom of the motor casing. The fluid in this top cavity chamber can be the same dielectric liquid used in the main body of the motor casing, or it can be a different material.

In a preferred embodiment, a relief valve is mounted in the top seal cavity chamber for venting dielectric fluid to the well casing in case of excessive pressure build-up within the motor. By providing an exit for pressured dielectric fluid other than around the shaft seals, this valve can prevent damage to the seals. Although the top chamber relief valve can be mounted anywhere in the cavity, it is generally desirable to locate it at the top of the chamber. In this location, any gases which build up in the motor casing can be vented out the well.

A second element of the protective system of the invention is a pressure-equalization chamber within the motor casing proper. The pressure-equalization chamber lies below the motor stator and rotor, and can be either an area of the chamber in which the stator and rotor are located, or a separate chamber in fluid contact with the stator-rotor chamber.

One portion of the pressure-equalization chamber contains a dielectric fluid, typically the same dielectric liquid which surrounds the motor stator and rotor. Another portion of the pressure-equalization chamber contains well fluid which migrates into this area of the chamber thorough a small orifice in the motor casing. These two areas of the chamber are divided by means of a flexible bladder—a liquid-impervious member formed of a resilient material such as rubber. In its operative environment, one side of the bladder will be in contact with the dielectric fluid in the pressure-equalization chamber, while the other side of the bladder will be in contact with well fluid. In this manner, thermal expansion of the liquid dielectric can be accommodated by expansion of the bladder on the dielectric side and the expulsion of well fluid from the pressure-equalization chamber through the casing orifice. Conversely, as the motor cools and the dielectric contracts, ingress of well fluid into the pressure-equalization chamber will cause the bladder to retract in the direction of the dielectric fluid until pressure equilibrium is achieved.

The third element of the protective system is a dielectric-fluid-containing pressure-relief chamber which lies adjacent the bottom of the motor assembly, beneath the pressure-equalization chamber. As is the case with the fluid in the top (seal cavity) chamber, the liquid in the pressure-relief chamber can be the same dielectric fluid which surrounds the motor stator and rotor. An inlet in this chamber, preferably adjacent the top thereof, serves as the terminus for the vent tube which exits the top seal cavity chamber. As a consequence, the top (seal cavity) and pressure-relief chambers are in fluid contact with one another.

One wall of the pressure-relief chamber (typically the base) comprises a spring-loaded diaphragm. The inner surface of the diaphragm is in contact with the dielectric fluid in the pressure-relief chamber, and the diaphragm's outer surface is in contact with a spring which is compressed to less than its maximum. This diaphragm can serve to absorb some of the increased volume resulting from thermal expansion of the dielectric fluid. Because the dielectric liquid in this chamber is under pressure, it also serves as a reservoir to replace any fluid which may leak out of the top seal cavity chamber.

The pressure-relief chamber also serves as a sump for any well fluid which migrates into the top seal cavity chamber. As described above, any denser well fluid entering the top cavity chamber will be transported to the pressure-relief chamber through the motor vent tube. When carried to this location, the well fluid is unlikely to enter that portion of the core of the motor which contains the stator and rotor.

Finally, the pressure-equalization chamber is optionally equipped with a relief valve to handle excessive build-up in internal pressure (i.e., pressures in excess of those the bladder system can handle). The outlet of this relief valve communicates with the dielectric-fluid-filled pressure-relief chamber, rather than with the well itself. Thus, should the pressure in the pressure-equalization chamber exceed the valve's threshold level (e.g., as a consequence of occlusion of the well-fluid orifice in the wall of the pressure-equalization chamber), this valve will open, and excess fluid will be dumped into the pressure-relief chamber.

As a result of these protective features, the central core of the motor is isolated from contact with well fluids by means of dielectric-fluid containing chambers at both ends of the motor.

BRIEF DESCRIPTION OF THE DRAWING

The objects and advantages of the invention will be better understood from the following detailed description taken in conjunction with the accompanying figure of the drawing, wherein.

DETAILED DESCRIPTION OF THE DRAWING

Figure 1:
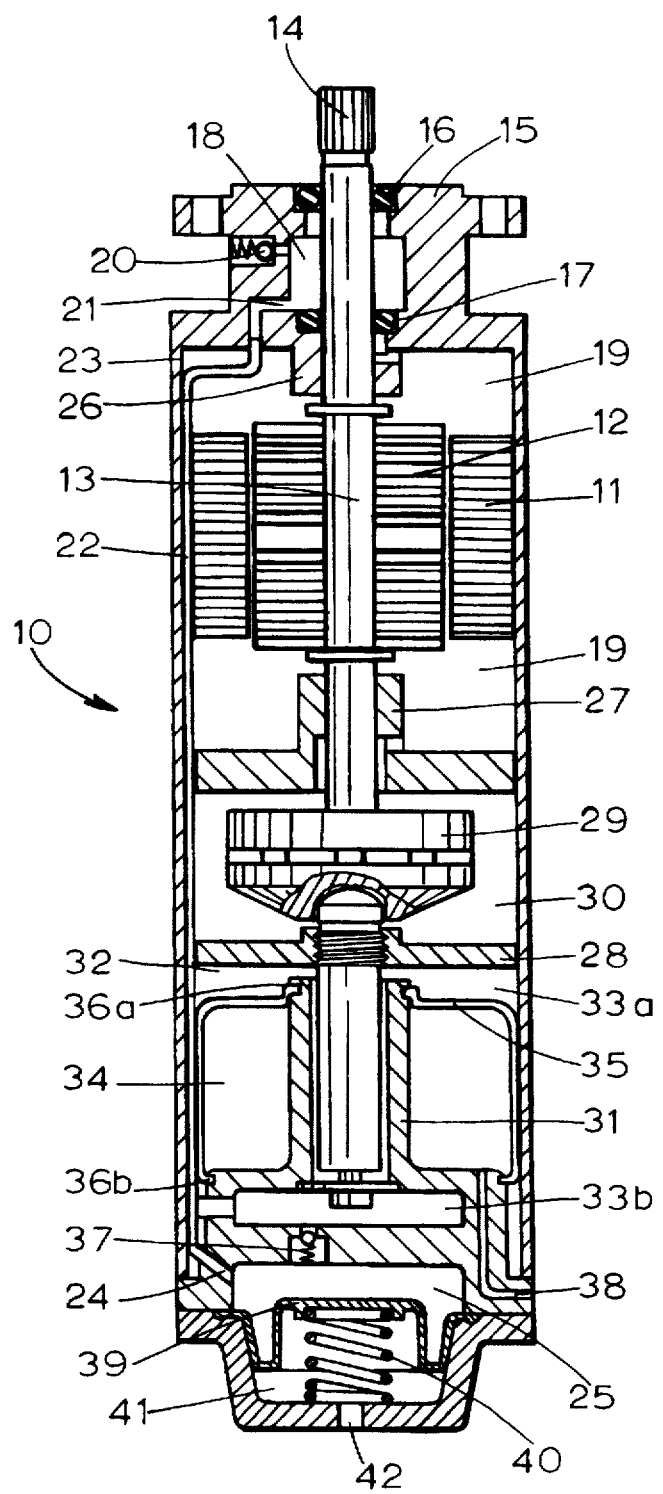
FIG. 1 is a longitudinal sectional view of an oil-filled submersible electric motor in accordance with the present invention.

FIG. 1 depicts an oil-filled electric motor which comprises an outer cylindrical shell or tubular casing 10 which encloses a stator 11 and a rotor 12. Rotor 12 is connected to a portion of a rotatable drive shaft 13 which extends along the vertical axis of casing 10. A spline or coupling end 14 of drive shaft 13 extends outside of a top portion 15 of casing 10. Coupling end 14 is adapted to interconnect with a drive shaft of a centrifugal pump, not shown.

Drive shaft 13 exits top portion 15 through a top shaft seal 16 which is designed to prevent the ingress of well fluid into casing 10, as well as egress of any fluid in the motor itself. Below top shaft seal 16 lies a top or seal cavity chamber 18, the bottom of which is defined, in part, by a second shaft seal 17 which assists in separating top chamber 18 from a motor lamination chamber 19 which contains stator 11 and rotor 12. Top chamber 18 and second chamber 19 contain dielectric fluids (not shown).

At the top of top chamber 18 is a first check valve assembly 20 for venting fluid in chamber 18 to the outside of casing 10 in the event of high pressure build-up in the motor. At the base of chamber 18 is a fluid outlet 21 which communicates with a small vent tube 22 which runs vertically along an interior surface 23 of tubular casing 10. The bottom end 24 of vent tube 22 communicates with a pressure-relief chamber 25 at the base of casing 10.

Drive shaft 13 passes through a plurality of bearing assemblies 26, 27, 28 31 within casing 10. A high-load thrust bearing assembly 29 along shaft 13 is located in a dielectric-filled thrust bearing chamber 30 located under motor-lamination chamber 19 and in fluid contact therewith.

Beneath thrust-bearing chamber 30 lies a pressure-equalization chamber 32, which is divided into interconnected dielectric-fluid containing sections 33a, 33b and well-fluid containing section 34 by a fluid-impervious flexible bladder 35. A well-fluid inlet tube or orifice 38 connects the exterior of casing 10 with well-fluid containing section 34 of chamber 32. Bladder 35 has bead sections 36a, 36b at the periphery to ensure that any dielectric liquid in sections 33a, 33b do not come into contact with well fluid in section 34. Pressure-equalization chamber 32 also contains a second check or relief valve 37 which connects dielectric-fluid containing section 33b with pressure-relief chamber 25.

The floor or base of pressure-relief chamber 25 comprises a diaphragm 39 which is formed of a flexible, resilient, liquid-impervious material such as a hard rubber, plastic, or metal. A spring 40 is mounted in a spring cavity 41 and exerts upward pressure on both diaphragm 39 an d dielectric liquid (no t shown) in chamber 25. Because chamber 25 is interconnected to top seal cavity chamber 18 by vent tube 22, spring 22 also exert s pressure on the liquid in top chamber 18. Casing bottom slot 42 permits well fluid to flow in and out of spring cavity 41.

Although the invention has been described in connection with the illustrated embodiment of a preferred embodiment of the present invention, these details are not intended to limit the invention which is defined in the following claims:

What is claimed is:

1. An electric motor for use beneath the surface of a well fluid comprising:
   (a) a tubular casing having a rotatable drive shaft along the vertical axis thereof, a coupling end of said drive shaft extending vertically upward from a closed end portion of said casing through a first shaft top seal;
   (b) a top chamber in said tubular casing, beneath said casing end portion, a first dielectric liquid in said top chamber, and a fluid outlet at the base of said top chamber;
   (c) a motor-lamination chamber in said tubular casing, said motor-lamination chamber containing a stator, a rotor which is operatively connected to said rotatable drive shaft, and a second dielectric liquid;
   (d) a second shaft seal between said top and motor-lamination chambers for isolating dielectric liquid in said motor-lamination chamber from the dielectric liquid in said top chamber;
   (e) a pressure-equalizing chamber within said tubular casing, beneath said motor-lamination chamber, said pressure-equalizing chamber containing a bladder which divides said chamber into a dielectric-fluid-containing portion and a well-fluid-containing portion;

(f) a pressure-relief chamber within said tubular casing, beneath said pressure-equalizing chamber, a wall of said relief chamber comprising the inner surface of a spring-loaded diaphragm, and a dielectric fluid inlet adjacent a bottom portion of said pressure-relief chamber for receiving fluid from said top chamber; and (g) a vent tube in said tubular casing which interconnects said top chamber fluid outlet with said relief chamber fluid inlet.

2. The electric motor of claim 1 wherein said motor casing contains a relief valve for venting pressurized liquid to the well fluid.

3. The motor of claim 2 wherein said relief valve is mounted adjacent said base of the top chamber.

4. The electric motor of claim 1 wherein said motor contains at least two relief valves comprising:

i) a first relief valve having an inlet end in communication with said pressure-relief chamber and an outlet end in communication with said well fluid; and ii) a second relief valve having an inlet end in communication with the interior of the pressure-equalizing chamber and an outlet end in communication with the pressure-relief chamber.

5. The electric motor of claim 1 wherein said motor contains at least two relief valves comprising:

i) a first relief valve adjacent the top of said motor, said valve having an inlet end in communication with the interior of said top chamber and an outlet end in communication with said well fluid; and ii) a second relief valve adjacent the bottom of said motor, said valve having an inlet end in communication with the interior of the pressure-equalizing chamber and an outlet end in communication with the pressure-relief chamber.

6. The electric motor of claim 1 wherein the motor-lamination chamber and the dielectric-fluid-containing portion of the pressure-equalizing chamber are in fluid communication with one another.

7. The electric motor of claim 1 wherein the dielectric liquid in the top chamber and the dielectric liquid in the motor-lamination chamber are the same.

8. The electric motor of claim 1 wherein the second dielectric fluid comprises mineral oil.

9. The electric motor of claim 1 wherein said well fluid comprises water.

10. The electric motor of claim 1 wherein the well-fluid-containing portion of the motor pressure-equalization chamber contains an orifice for permitting the entry of well fluid therein.

11. The motor of claim 1 wherein said bladder comprises rubber.

12. The motor of claim 1 wherein said vent tube is within said tubular casing.

* * * * *